United States Patent [19]

Lindsey

[11] 3,795,903

[45] Mar. 5, 1974

[54] MODIFIED PHASE ENCODING

[75] Inventor: Royce Darwin Lindsey, Austin, Tex.

[73] Assignee: International Business Machines Corporation, Armonk, N.Y.

[22] Filed: Sept. 29, 1972

[21] Appl. No.: 293,688

[52] U.S. Cl. ................360/42, 178/67, 178/69.5 R, 360/48, 325/58, 340/146.1 D, 340/174.1 G

[51] Int. Cl. ............................................ G11b 5/04

[58] Field of Search........... 178/67, 69.5 R, 69.5 G; 325/58; 340/146.1 D, 146.1 F, 174.1 A, 174.1 R

[56] References Cited

UNITED STATES PATENTS

| | | | |
|---|---|---|---|
| 3,524,164 | 8/1970 | Cox et al. | 340/174.1 R X |
| 3,456,239 | 7/1969 | Glasson | 340/146.1 D |
| 3,309,463 | 3/1967 | Roedl | 178/69.5 R |
| 3,427,605 | 2/1969 | Gabor | 340/174.1 A |
| 3,641,526 | 2/1972 | Bailey et al. | 340/174.1 A |
| 3,693,098 | 9/1972 | Sevilla | 178/69.5 R X |

*Primary Examiner*—Malcolm A. Morrison
*Assistant Examiner*—R. Stephen Dildine, Jr.
*Attorney, Agent, or Firm*—James H. Barksdale, Jr.

[57] ABSTRACT

An encoding and decoding technique for detecting loss of phase and/or bit sync, and resynchronizing following an error. Both detection and resynchronization are accomplished on a per character basis. With seven bits being used per character, the bits making up each character are phase encoded in a conventional manner. For defining each character, an additional ½ bit time is added between bits 7 and 1 and encoded such that a corrective flux reversal may occur at ½ T (where T equals the normal intracharacter bit time), a transition must not occur at T (normal data time), and the 1 bit of the next character must occur at 1½ T. Digital data separation is used to define corrective flux reversals and data bits, and any flux transitions outside the limits defined are considered errors. During decoding, the data separation logic is resynchronized on each detected data transition by the sync signal. With this method, if either phase or bit sync is lost within any character, an error condition will be detected at least before bit 1 of the next character.

27 Claims, 5 Drawing Figures

MODIFIED PHASE ENCODING

BACKGROUND OF THE INVENTION

1. Field of the Invention

This invention relates to phase en-coding in general, and more specifically to encoding and decoding for facilitating detection of errors in a block of data and minimizing the amount of data lost per error incident.

2. Description of the Prior Art

The technique of phase encoding per se is well known and has been used widely. The problems associated with the use of phase encoding have varied as have the uses. For example, in many applications it is desired to record a page of approximately four thousand characters of text as a single record on a tape, using a single track and recording serially by bit. A self clocking recording technique, such as phase encoding is required. If data characters to be recorded are seven bits each, a minimum of twenty eight thousand bits per record are required.

Following a detected error in a record it is highly probable that phase sync (distinction of data and corrective flux reversals) and bit counter sync (knowledge of a particular bit position within a character that a given data bit is to occupy) will be lost. This implies that a single error within a record will cause all following data in that record to be lost. Furthermore, with seven bits recorded per character, there is a possibility that either phase or bit sync may be lost without detecting an error, thus causing invalid data to be read.

Some of these problems may be eliminated, or reduced, by adding an additional error checking bit to each character, adding error checking codes at the end of the record, or segmenting the data into shorter blocks to reduce the amount of data lost due to a single error. All of these techniques add additional length to a block, resulting in a lower average data rate and longer access time over the block. That is, these techniques do not permit the packing of data for increasing the efficiency of encoding and decoding. Furthermore, unless the data is segmented to one character per record, a detected error will result in the loss of subsequent characters. Also, an error may not be detected in the character in which it incurs.

SUMMARY OF THE INVENTION

The aforementioned problems are overcome through the use of the encoding, decoding, error detection, and resynchronization techniques of this invention. Bits 1 through 7 are phase encoded in a conventional manner. An additional ½ bit time is added between bit 7 of one character and bit 1 of the next character and encoded such that 1) a corrective flux reversal may occur at ½ T, 2) a transition (flux reversal) must not occur at T, and 3) the 1 bit of the next character must occur at 1½ T. Digital data separation is used to establish windows to gate corrective flux reversals and data bits, and any flux transitions outside the specified times are considered to be errors. Between characters, different data and error windows are established. If it is desired to read the data in reverse, different windows are established to account for the asymmetry of the signal. The data separation logic is resynchronized on each detected data transition. If either phase or bit sync is lost within a character, an error condition will be detected at least before bit 1 of the next character.

Following a detected error, resynchronization is accomplished by resetting a bit counter to bit 1 and assuming that the next flux reversal is bit 1 of the next character. Thus if the error occurred during the intercharacter time, the bit counter would be in sync. If no additional errors occur through the next character, including the intercharacter time, the character is considered valid. Following an error, no additional error codes are output to the system until a complete character is read.

DESCRIPTION OF THE PREFERRED EMBODIMENT

Figure 1:
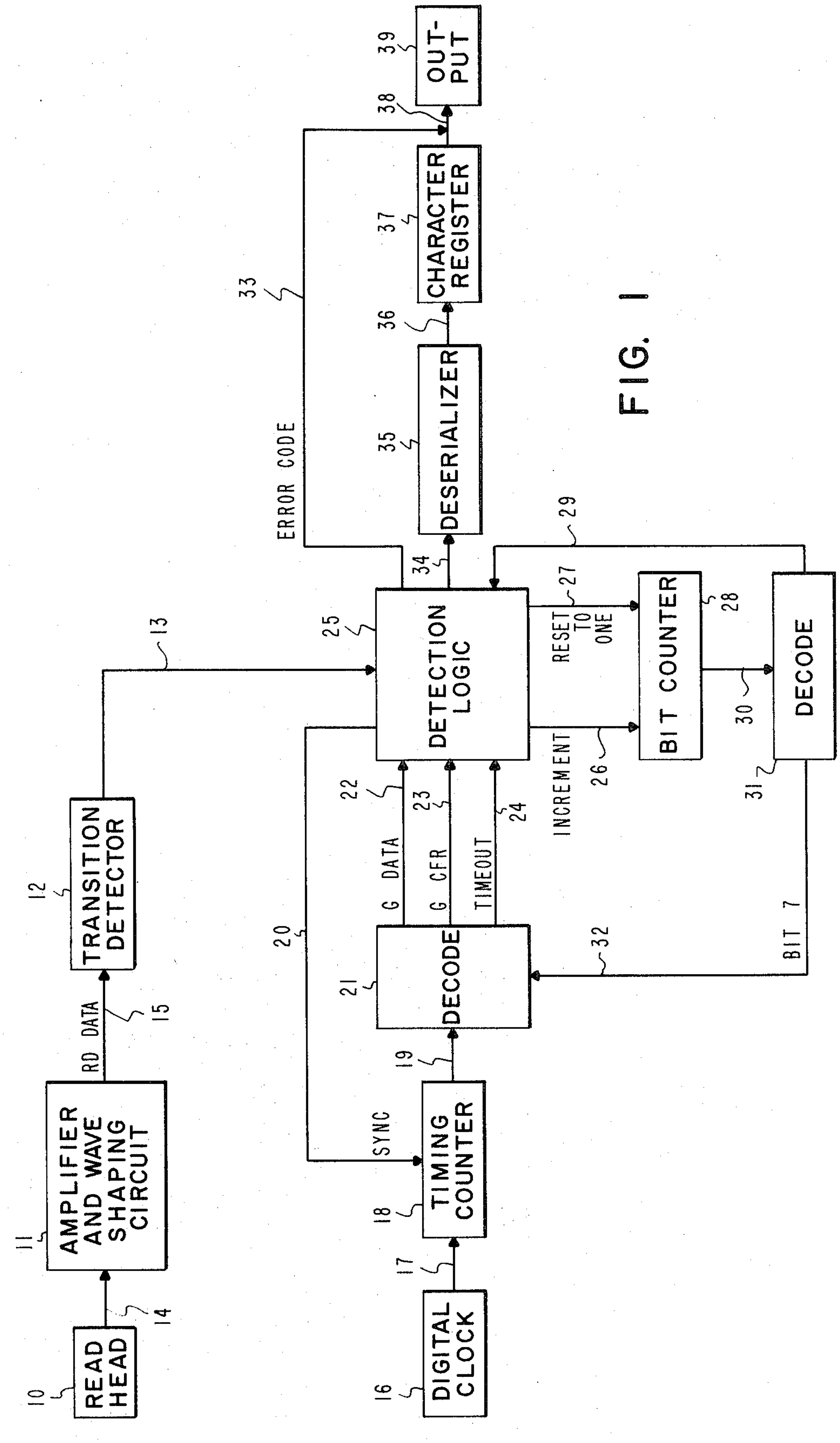
FIG. 1 is a block diagram illustrating the structure for decoding and detecting errors in recorded data encoded according to the techniques of this invention.
Figures 2, 4:
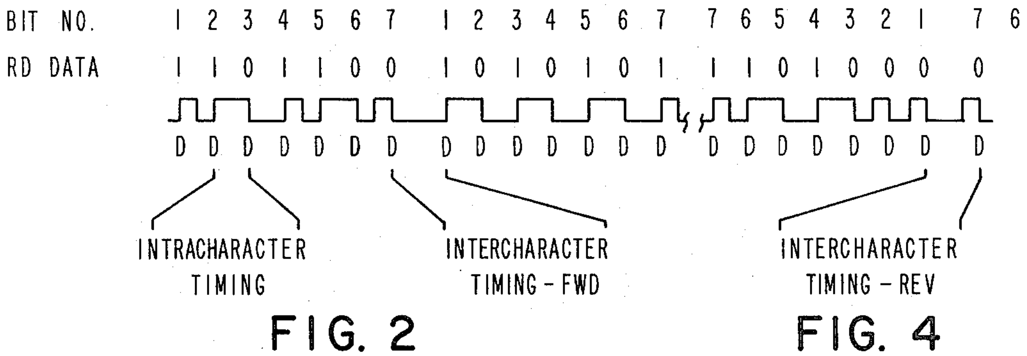
FIG. 2 illustrates an encoding technique for a character sequence according to this invention.
FIG. 4 illustrates the decode upon reverse reading of a character sequence encoded according to this invention.

For a more detailed description of the invention, reference is first made to FIG. 1 wherein there is shown a magnetic read head 10 for reading data which has been encoded on a recording media. The output of read head 10 is applied along line 14 to an amplifier and wave shaping circuit 11. Circuit 11 generates a reproduction of the recorded data. This reproduction can correspond to the recorded signals (RD DATA) illustrated in FIGS. 2 and 4. In FIG. 2 the data is read in a forward direction, and in FIG. 4 the data is read in a reverse direction. The output of the amplifier and wave shaping circuit 11 is applied along line 15 to a transition detector 12. Detector 12 detects transitions of the RD DATA line and signals the detection logic 25 along line 13 when a transition (flux reversal) is detected.

A digial clock 16 drives a timing counter 18 along line 17. The states of the timing counter 18 are applied along line 19 to decode 21. Decode 21 generates the timing signals gate data (G DATA), gate corrective flux reversal (G CFR), and timeout along lines 22, 23, and 24, respectively. The signals applied along lines 22, 23, and 24 are applied to detection logic 25. Detection logic 25 is considered well within the skill of one in the art, being made up of readily implementable combinational logic. Detection logic 25 performs generally the function described in FIG. 5 for separating data transitions from corrective flux reversals, determining phase of data transition, detecting errors and controlling bit counter 28 and timing counter 18. Bit counter 28 is incremented along line 26 and reset to one along line 27. The output of bit counter 28 along line 30 is to decode 31. A signal is output from decode 31 along line 32 to decode 21 when bit 7 is detected. Also, signals are output from decode 31 along line 29 to detection logic 25 as each bit is detected.

The output of detection logic 25 is along line 34 to deserializer 35. Valid data bits are gated through deserializer 35 and along line 36 to character register 37. Character register 37 is sampled by output 39 (system) along line 38 after each valid character is decoded. When an error is detected, an error code is sent directly to output 39 along line 33 from detection logic 25. Output 39, for purposes herein, can be a printer.

Figure 3:
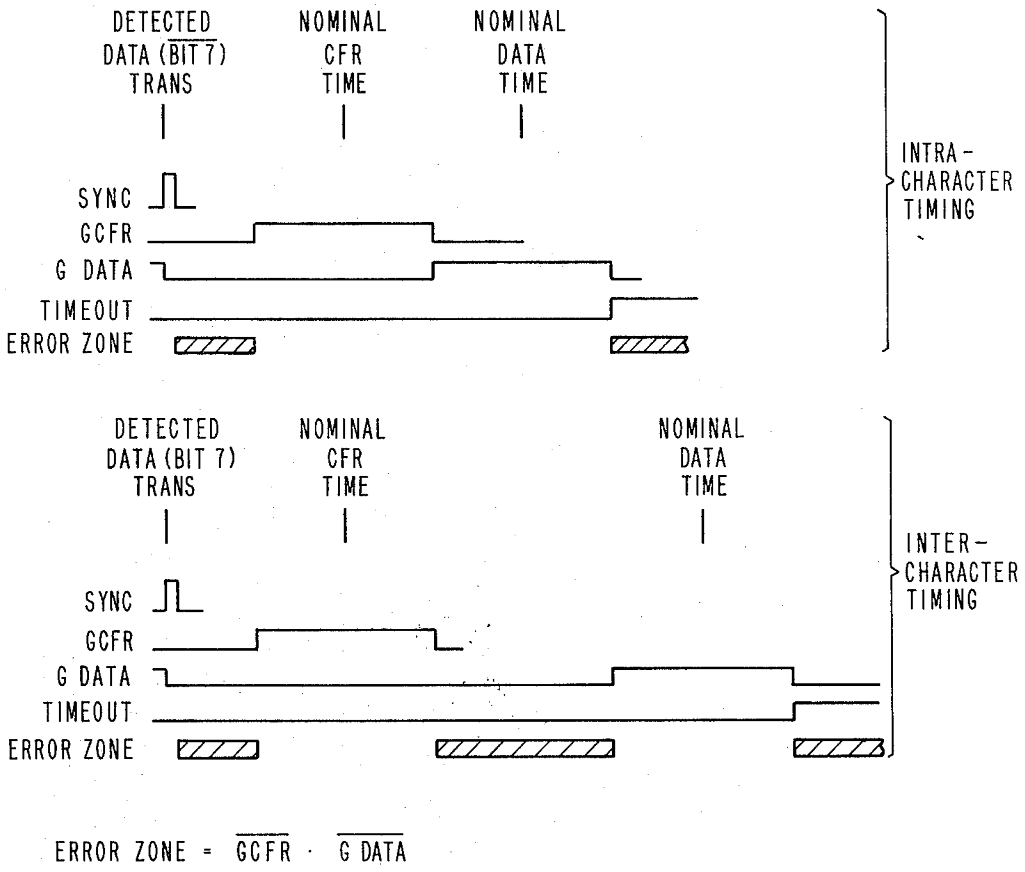
FIG. 3 illustrates the digital clocking used 1) for driving a timing counter and generating a number of signals, and 2) to separate data and corrective flux reversals.

Again, when bit 7 is decoded by decode 31, it is fed back to decode 21 to control the gating signals opposite intercharacter timing illustrated in FIG. 3.

Reference is next made to FIG. 2 wherein two characters are illustrated and represented by bits 1 through 7 each. Also shown opposite read data (RD DATA) is the sequence of flux transitions (reversals) detected by magnetic read head 10 (FIG. 1) for each bit. These flux transitions for each bit are related to the intracharacter timing such as that illustrated between bits 2 and 3 of the first (left) character. Also illustrated is the intercharacter timing for reading in the forward direction. That is, intercharacter timing is the timing applied between bit 7 of the first character and bit 1 of the second character. Also, as pointed out above, digital clocking is used to separate the data flux reversals from the corrective flux reversals. For example, there is a corrective flux reversal between bits 1 and 2 of the first character and no reversal between bits 2 and 3 of the first character.

Referring next to FIG. 3, at a detected data flux transition within a character (for example, bit 1 of the first character), a sync pulse is generated to reset a timing counter. Following the sync pulse, a sequence of gating signals or comparative conditions, are generated by counting a clock signal and decoding the counter states. A detected flux transition during this gating sequence will cause the following operations to be performed. When G CFR is true, no operation or action takes place. When G DATA is true, a flux transition is assumed to be a data transition, the transition direction is noted (and therefrom the bit value is determined), and a sync pulse is generated thereafter to start a timing sequence for the next flux transition. If both G CFR and G DATA are false (low) when a transition is detected, an error condition is set as illustrated by ERROR ZONE. Also, if a data transition does not occur during the time G DATA is high, the timeout signal will become true (high) which will also indicate an error condition.

As an example of the above, assume that bit 1 of the first character shown in FIG. 2 is read. In this case, intracharacter timing is applied. For this data transition, a sync pulse is generated and G CFR is low. G DATA will become low on this detected data transition. An error zone is thus created such that if a transition occurs when either G CFR or G DATA are low, and before the normal CFR time, an error condition will exist. For the data illustrated in FIG. 2, there is no error and during the normal CFR time, a flux transition is detected with G CFR high. Also during this time, G DATA remains low. When bit 2 is detected G CFR is low and G DATA is high. If bit 2 is not detected during the time G DATA is high, a timeout signal will become high and an error condition will exist. Since the data illustrated is valid when the bit 2 transition is detected, another sync pulse is generated for bit 2. Also, the timing circuit is reset, which causes G DATA to go low.

When the intercharacter timing is considered, reference is made to the lower portion of FIG. 3. Opposite intercharacter timing there is shown the sequence, or set, of signals (comparative conditions) generated following the detection of bit 7 of the first character shown in FIG. 2. In this case, the gating signals have a different arrangement than those for intracharacter timing. This is to allow for a nominal data time at a 1½ bit distance instead of a 1 bit distance. Following bit 7, the G CFR timing is the same as for intracharacter bit times, but it may be seen that a transition wbich would be accepted as data with intracharacter timing will cause an error condition with intercharacter timing and conversely.

From the above, bits 1 through 7 have been phase encoded in a conventional manner. During decoding for intracharacter timing, digital data separation is used to establish windows to gate out the corrective flux reversals (CFR), gate the data bits, and any data transitions outside these specified times are considered to be errors. The data separation logic is resynchronized on each detected data transition by the sync signal.

The encoding for intercharacter timing involves an additional ½ bit time which is added between bits 7 and 1 using bit 7 as a reference. During decoding, a corrective flux reversal may occur at ½ T (where T equals the normal intracharacter bit time), a transition must not occur at T (normal data time), and the 1 bit of the next character must occur at 1½ T. Thus between characters, different data and error windows are required for intercharacter timing. If it is desired to read the data in reverse, the windows are further changed as shown in FIG. 4 under intercharacter timing - reverse.

Referring again to FIG. 3, if either phase or bit sync is lost within a character, an error condition will be detected at least before bit 1 of the next character. For example, if bit 6 is thought to be bit 7, the intercharacter timing will be applied and the flux reversal at the normal data time will result in detection of the error. If bit 7 is thought to be bit 6, the intracharacter timings will be applied and the absence of a flux reversal at the normal data time will result in detection of the error. If a phase reversal is thought to be a data reversal, it may be detected within the character, but if the pattern (all ones or all zeros) is such that it is not detected until bit 7, the period before bit 1 of the next character will be too long and the error will be detected.

One of the more important aspects of this invention relates to resynchronization of the detection logic following an error.

Following a detected error, resynchronization is accomplished by resetting the bit counter to one and assuming the next flux reversal is bit 1 of the next character. Thus, if an error occurred at the intercharacter time, the bit counter would be in sync. If no additional errors occur through the next character (including intercharacter time), the character is valid. If an error occurs at bit 2 for example, and the counter is reset to bit 1, additional errors may occur within the character if the phase sync is improper. An error will certainly occur following bit 7, which will resync the counter to bit 1. Following an error, no additional error codes are transmitted to the system until a complete character is read with errors.

Figure 5:
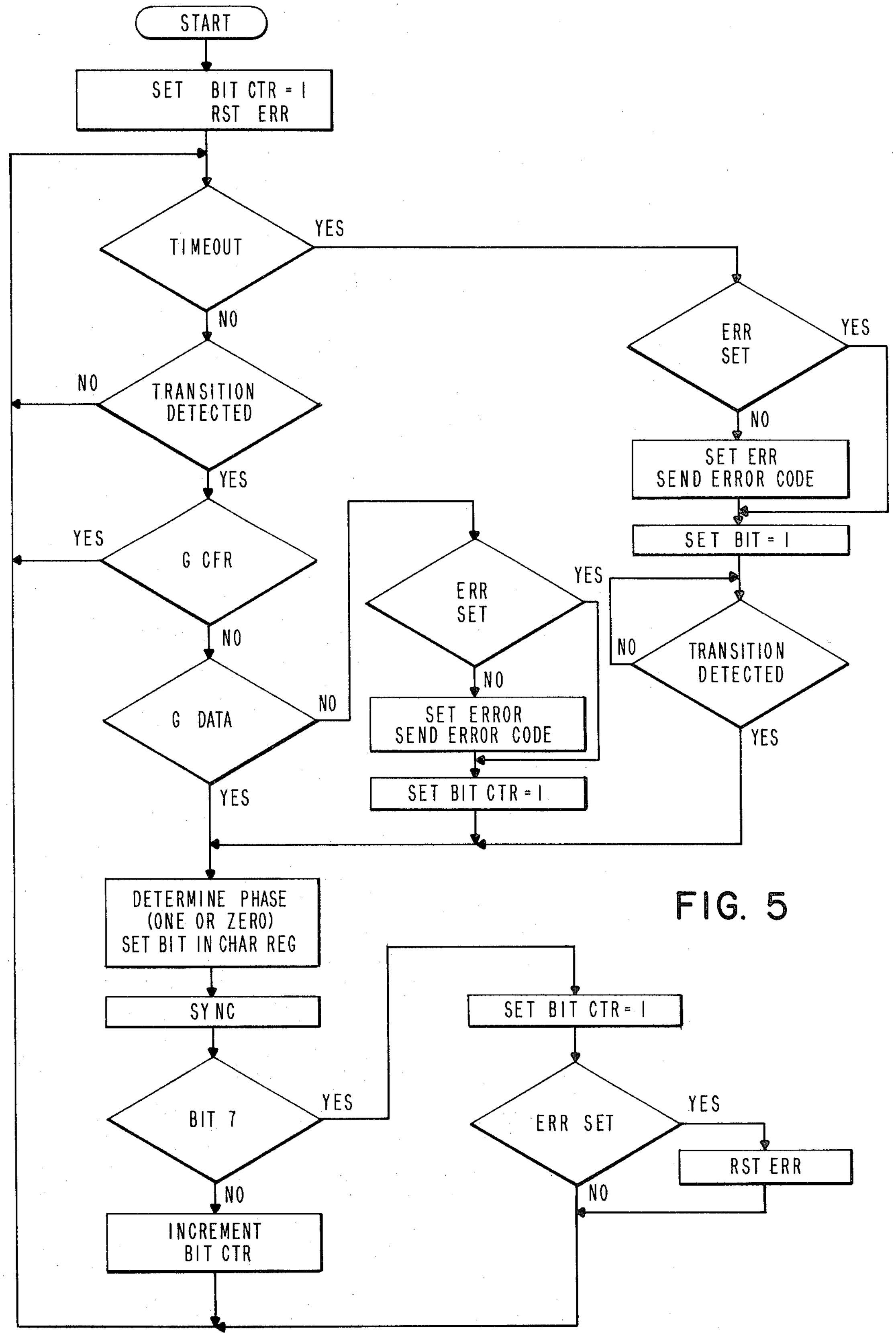
FIG. 5 is a flow chart showing the logic by which the decoding technique resynchronizes following an error, and illustrating the operation within a block of data.

Referring next to FIG. 5 there is shown a flow chart illustrating the operation of this invention. The operation is started with the read head reading the recorded data on a tape or other recording media. The bit counter is set equal to one and an error latch in the detection logic is reset. If the timeout condition has not occurred, as would be the case on start-up, a transition is sought. When detected, a determination is made as to whether the G CFR signal is high or low. If high, then the next transition is sought. If G CFR is low when a transition is detected, a determination is then made as to whether G DATA is high or low. If G DATA is high, the phase of the detected transition is then stored in the character register and a sync signel is generated to reset the timing counter and return G CFR and G DATA to their low states. If the transition is not for bit 7, the bit counter is incremented and the above timing sequence is repeated.

When bit 7 is detected, the bit counter is reset to one and the intercharacter timing sequence is applied.

If a transition is detected when both G CFR and G DATA are low, an error condition exists and an error latch is set. Also, the bit counter is reset to one. If the timeout signal becomes high indicating that a transition did not occur during the normal data time, then the error latch is set. Also, the bit counter is reset to one. Thereafter, another transition is sought.

The bits of each character are analyzed and stored in character register 37 (FIG. 1). From the above, the character register would be full following detection of bit 7. However, it is important that the character not be considered valid, and thus output to the system, until after the normal data transition time following bit 7. This is to insure detection of possible loss of bit sync.

The above description has been related to operations within a block of digital data recorded serially by bit. Any number of methods are available in the prior art for determining the beginning of the block.

Also, in the above description the data has been broken down on a per character basis. The techniques described would also be applicable to segments made up of a number of characters. In such a case, the difference in the defined format would only vary per segment rather than per character. That is, each character in the segment would be separated by one bit time and each segment would be separated by 1½ bit times for distinguishing segments. Of course, the segments could be separated by any number of fractional bit times. The only requirement in this respect is that a flux reversal not be permitted to occur at one bit time. The reason for this is that a flux reversal occurring at one bit time between segments could be taken as a data bit.

For purposes of simplicity of description, each character has been defined in terms of 7 bits. It is to be noted though that any number of bits could be used to make up each of the characters. That is, each character could be represented by only one bit.

In summary, an encoding technique is employed which facilitates the detection of format errors upon decoding without loss of synchronization beyond one character. The bits making up the characters are phase encoded in a conventional manner. An additional ½ bit time is added between bit 7 of one character and bit 1 of the next character and encoded such that 1) a corrective flux reversal may occur at ½ T, 2) a transition (flux reversal) must not occur at T, and 3) the 1 bit of the next character must occur at 1½ T. Digital data separation is used to establish windows to gate corrective flux reversals and data bits, and any flux transitions outside the specified times are considered to be errors. Between characters, different data and error windows are established. If it is desired to read the data in reverse, different windows are established to account for the asymmetry of the signal. The data separation logic is resynchronized on each detected data transition. If either phase or bit sync is lost within a character, an error condition will be detected at least before bit 1 of the next character.

Following a detected error, resynchronization is accomplished by resetting a bit counter to bit 1 and assuming that the next flux reversal is bit 1 of the next character. Thus if the error occurred during the intercharacter time, the bit counter would be in sync. If no additional error occurs through the next character, including the intercharacter time, the character is considered valid. Following an error, no additional error codes are output to the system until a complete character is read.

While the invention has been particularly shown and described with reference to particular embodiments, it will be understood by those skilled in the art that various changes in form and detail may be made without departing from the spirit and scope of the invention.

What is claimed is:

1. A method of recording a block of digital data for facilitating error checking during decoding, said method comprising phase encoding said data on a per segment basis according to a defined format wherein 1) each data bit making up a segment is separated by one bit time, and 2) a flux reversal between segments will not occur at one bit time following the last data bit of each segment.

2. A method according to claim 1 wherein 0aid phase encoding according to a defined format includes adding a number of fractional bit times to each segment for distinguishing each segment.

3. A method according to claim 2 wherein said fractional bit times added to each segment are added at the end of the last data bit of each segment.

4. A method according to claim 3 wherein said phase encoding according to a defined format includes causing any flux reversal between segments to occur at one of said fractional bit times following the last data bit of each segment.

5. A method according to claim 4 wherein said phase encoding according to a defined format includes separating each segment by one and one-half bit times.

6. A method according to claim 5 wherein said phase encoding on a per segement basis includes phase encoding said data on a per character basis.

7. A method according to claim 5 wherein said data is recorded serially by bit.

8. A method of detecting errors in recorded digital data, phase encoded on a per segment basis according to a defined format wherein 1) each data bit making up each segment is to be separated by one bit time, and 2) a flux reversal between segments is not to occur at one bit time following the last data bit of each segment, said method comprising:

a. reading said recorded data;
b. synchronizing the timing of a first set of comparative conditions upon reading a flux reversal for each data bit other than the last data bit of each segment in said recorded data;
c. synchronizing the timing of a second set of comparative conditions upon reading a flux reversal for said last data bit of each segment in said recorded data; and d. comparing said first and second conditions with other flux reversals read from said recorded data.

9. A method according to claim 8 wherein said synchronizing the timing of said first and second conditions includes generating a sync signal when a data bit is read.

10. A method according to claim 9 wherein said first and second conditions comprise signals generated according to said defined format.

11. A method according to claim 10 further including signalling an error condition when said first and second conditions do not correspond to said other flux reversals read from said recorded data.

12. A method according to claim 11 further including counting data bits making up said segments.

13. A method according to claim 12 further including resynchronizing the timing of one of said first and second conditions, according to the bit counted during said counting, when a flux reversal is read from said recorded data.

14. A method according to claim 12 further including resynchronizing the timing, when said error condition is signalled, of one of said first and second conditions, when a flux reversal is read from said recorded data.

15. A method according to claim 14 further including inhibiting any signalling of any additional error conditions for subsequent errors in a segment until a complete segment has been read without an error.

16. A method of recording a block of digital data, decoding said recorded data, and detecting format errors in said recorded data, said method comprising:

a. phase encoding said data on a per segment basis according to a defined format wherein 1) each data bit making up each segment is separated by one bit time, and 2) a flux reversal between segments will not occur at one bit time following the last data bit of each segment;
b. decoding said phase encoded data;
c. synchronizing a first set of comparative conditions for intrasegment timing during said decoding;
d. synchronizing a second set of comparative conditions for intersegment timing during said decoding; and
e. comparing said first and second conditions correspondingly with said phase encoded data during said decoding.

17. A method according to claim 16 wherein said phase encoding according to a defined format includes adding a number of fractional bit times to each segment for distinguishing each segment.

18. A method according to claim 17 wherein said fractional bit times added to each segment are added at the end of the last data bit of each segment.

19. A method according to claim 18 wherein said phase encoding according to a defined format includes causing any flux reversal between segments to occur at one of said fractional bit times following the last data bit of each segment.

20. A method according to claim 19 wherein said phase encoding according to a defined format includes separating each segment by one and one-half bit times.

21. A method according to claim 16 wherein said synchronizing the timing of said first and second conditions includes generating a sync signal when a data bit is decoded.

22. A method according to claim 21 wherein said first and second conditions comprise signals generated according to said defined format.

23. A method according to claim 22 wherein the directions of flux reversals for the last data bit of one segment and the first data bit of a following segment are determined for determining whether a flux reversal is to occur before the first data bit of said following segment.

24. A method according to claim 23 further including signalling an error condition when said first and second conditions do not correspond to other flux reversals during said decoding.

25. A method according to claim 24 further including counting data bits making up said segments.

26. A method according to claim 25 further including resynchronizing said timing of one of said first and second conditions, according to the bit counted during said counting, when a flux reversal is decoded.

27. A method according to claim 25 further including resynchronizing said timing, when said error condition is signalled, of one of said first and second conditions, when a flux reversal is decoded.

* * * * *